United States Patent
Kim (10) Patent No.: US 8,634,672 B2
(45) Date of Patent: Jan. 21, 2014

(54) DIGITAL IMAGE SIGNAL PROCESSING APPARATUS AND METHOD

(75) Inventor: Young-geol Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 12/916,970

(22) Filed: Nov. 1, 2010

(65) Prior Publication Data

US 2011/0103709 A1    May 5, 2011

(30) Foreign Application Priority Data

Nov. 2, 2009    (KR) .................. 10-2009-0104984

(51) Int. Cl.
  *G06K 9/40* (2006.01)
  *G06K 9/32* (2006.01)
(52) U.S. Cl.
  USPC ........................ 382/254; 382/305; 382/299
(58) Field of Classification Search
  USPC ........... 382/254, 260, 299, 305, 307; 345/560
  See application file for complete search history.

(56) References Cited

U.S. PATENT DOCUMENTS

| | | | | |
|---|---|---|---|---|
| 5,379,127 A * | 1/1995 | Ando | ............................ | 358/448 |
| 5,585,863 A * | 12/1996 | Hackett et al. | ................ | 348/716 |
| 6,801,250 B1 * | 10/2004 | Miyashita | .................. | 348/220.1 |
| 7,388,607 B2 * | 6/2008 | Nakahira | ................... | 348/240.2 |
| 7,760,244 B2 * | 7/2010 | Fukuzawa | ................... | 348/222.1 |
| 7,812,875 B2 * | 10/2010 | Takahashi et al. | ............. | 348/296 |
| 8,077,253 B2 * | 12/2011 | Hosokawa et al. | ........... | 348/354 |
| 2003/0174768 A1 * | 9/2003 | Hall et al. | ................ | 375/240.01 |
| 2004/0085462 A1 * | 5/2004 | Sasaki | ........................ | 348/231.6 |
| 2005/0140796 A1 * | 6/2005 | Okabe | ...................... | 348/231.99 |
| 2010/0214306 A1 * | 8/2010 | Kim | .............................. | 345/560 |

\* cited by examiner

*Primary Examiner* — Shefali Goradia
(74) *Attorney, Agent, or Firm* — Drinker Biddle & Reath LLP (57) ABSTRACT

A digital image signal processing apparatus includes a plurality of line memories, a line memory control unit that controls input image data corresponding to an input image to be input to each of the plurality of line memories and to be output from the plurality of line memories, a data patch generating unit that sequentially accesses the input image data stored in each of the plurality of line memories and generates a data patch for noise reduction filtering, and a filtering unit that performs the noise reduction filtering on the data patch and generates output image data. A digital image signal processing apparatus and method thereof thus may perform a high-speed noise reduction filtering operation and generate an output image having a same size as an input image while maintaining a same quality as the input image.

15 Claims, 7 Drawing Sheets

| 0 | 0 | 0 |
|---|---|---|
| $a_1$ | 0 | 0 |
| $b_1$ | 0 | 0 |

FIG. 6B

| 0 | 0 | 0 |
|---|---|---|
| $a_2$ | $a_1$ | 0 |
| $b_2$ | $b_1$ | 0 |

FIG. 7

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ | $a_{13}$ | 0 |
| 0 | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | 0 |
| 0 | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | 0 |
| 0 | $d_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | 0 |
| 0 | $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | 0 |
| 0 | $f_1$ | $f_2$ | $f_3$ | $f_4$ | $f_5$ | $f_6$ | $f_7$ | $f_8$ | $f_9$ | $f_{10}$ | $f_{11}$ | $f_{12}$ | $f_{13}$ | 0 |
| 0 | $g_1$ | $g_2$ | $g_3$ | $g_4$ | $g_5$ | $g_6$ | $g_7$ | $g_8$ | $g_9$ | $g_{10}$ | $g_{11}$ | $g_{12}$ | $g_{13}$ | 0 |
| 0 | $h_1$ | $h_2$ | $h_3$ | $h_4$ | $h_5$ | $h_6$ | $h_7$ | $h_8$ | $h_9$ | $h_{10}$ | $h_{11}$ | $h_{12}$ | $h_{13}$ | 0 |
| 0 | 0 | 0 | 0 | 0 | 0 | 0 | 0 | 0 | 0 | 0 | 0 | 0 | 0 | 0 |

FIG. 8

|   | −1 |   |
|---|----|---|
| −1 | 4 | −1 |
|   | −1 |   |

DIGITAL IMAGE SIGNAL PROCESSING APPARATUS AND METHOD

CROSS-REFERENCE TO RELATED PATENT APPLICATION

This application claims the priority benefit of Korean Patent Application No. 10-2009-0104984, filed on Nov. 2, 2009, in the Korean Intellectual Property Office, the disclosure of which is incorporated herein in its entirety by reference.

BACKGROUND

1. Field of the Invention

Embodiments relate to a digital image signal processing apparatus and method capable of generating a data patch for noise reduction filtering, performing a high-speed operation, and thus generating an output image having the same size as an input image while maintaining the same quality as the input image.

2. Description of the Related Art

With respect to digital image signal processing apparatuses, megapixel-related competition is in saturation and thus competition between manufacturers has expanded to high sensitivity photographing. In this regard, there is a problem since noise due to heat generated by a charge coupled device (CCD) or a complementary metal-oxide semiconductor (CMOS), or low frequency noise due to interference in an electric circuit is intensified due to signal amplification when the high sensitivity photographing is performed. Thus, efficient reduction of noise generated in an output image becomes an important issue.

According to conventional technology, a low pass filter (LPF) is often used to simply perform noise reduction (NR). Via an LPF, since a noise component is generated as a high frequency component in a plane portion of an image, noise is reduced by cutting off the high frequency component.

However, by using an LPF, an edge component of an image may also be reduced such that sharpness of the image deteriorates, and in this regard, there is a demand for technology capable of only reducing noise while maintaining edge components.

In this regard, technology for performing NR by sampling an image and then processing the image via software is introduced.

However, such a NR technology based on software processing has a disadvantage in that high-speed processing is impossible. That is, all calculations are performed in a central processing unit (CPU) and thus, processing speed is dependent upon the CPU. However, the CPU has to perform not only image processing but also performs other operations simultaneously, and thus, the processing speed is limited. In addition, image data before being processed via software is stored in a storage device including a memory, secure digital (SD)/compact flash (CF)/smart media (SM) cards or the like, and speed for retrieving the image data stored in the storage device for a process via the software is considerably limited.

SUMMARY

A digital image signal processing apparatus and method of generating a data patch perform a high-speed noise reduction filtering operation and generate an output image having a same size as an input image while maintaining a same quality as the input image.

According to an embodiment, a digital image signal processing apparatus includes a plurality of line memories; a line memory control unit that controls input image data corresponding to an input image to be input to each of the plurality of line memories, and controls the input image data to be output from the plurality of line memories; a data patch generating unit that sequentially accesses the input image data stored in each of the plurality of line memories, and generates a data patch for noise reduction filtering; and a filtering unit that performs the noise reduction filtering on the data patch, and generates output image data, wherein the line memory control unit generates a second vertical signal and a second horizontal signal obtained by respectively extending a first vertical signal and a first horizontal signal that correspond to the input image, and controls input and output of the plurality of line memories according to the second vertical signal and the second horizontal signal.

The line memory control unit may further include a vertical signal extending unit that generates the second vertical signal by extending each of start and end of the first vertical signal by $(N-1)/2$ according to a $(N \times N)$ filter for the noise reduction filtering; and a horizontal signal extending unit that generates the second horizontal signal by extending each of a start and an end of the first horizontal signal by $(N-1)/2$ according to the $(N \times N)$ filter.

The line memory control unit may further include an extended image data generating unit that generates extended image data corresponding to an image extended by the second vertical signal and the second horizontal signal.

The extended image data may have a predetermined random value or a value equal to input image data that is a target for a noise reduction filtering calculation.

Input image data of a center portion may be the target for the noise reduction filtering calculation and when a difference between the input image data of the center portion and a pixel value of an adjacent portion in the data patch is less than a reference value, the filtering unit may exclude the pixel value of the adjacent portion.

A size of the input image and a size of an output image corresponding to the output image data may be equal to each other.

The input image may include a full high-definition (FHD) image quality.

The input image may indicate a moving picture.

The line memory control unit and the data patch generating unit may include at least one of an application-specific integrated circuit (ASIC), a substrate, and a field-programmable gate array (FPGA).

According to another embodiment, a digital image signal processing method of a digital image signal processing apparatus comprising a plurality of line memories includes the operations of generating a second vertical signal and a second horizontal signal obtained by respectively extending a first vertical signal and a first horizontal signal that correspond to an input image; inputting input image data corresponding to the input image to each of the plurality of line memories according to the second vertical signal and the second horizontal signal; sequentially outputting the input image data stored in each of the plurality of line memories according to the second vertical signal and the second horizontal signal, and generating a data patch for noise reduction filtering of the input image data; and performing the noise reduction filtering on the data patch, and generating output image data.

The operation of generating the second vertical signal and the second horizontal signal may include the operations of generating the second vertical signal by extending each of a start and an end of the first vertical signal by $(N-1)/2$ according to a (N×N) filter for the noise reduction filtering; and generating the second horizontal signal by extending each of a start and an end of the first horizontal signal by (N−1)/2 according to the (N×N) filter.

The digital image signal processing method may further include the operation of generating extended image data corresponding to an image extended by the second vertical signal and the second horizontal signal.

The extended image data may have a predetermined random value or a value equal to input image data that is a target for a noise reduction filtering calculation.

The digital image signal processing method may further include the operation of excluding a pixel value of an adjacent portion when a difference between input image data of a center portion and the pixel value of the adjacent portion in the data patch is less than a reference value, wherein the input image data of the center portion is the target for the noise reduction filtering calculation. Here, the noise reduction filtering may be performed on the data patch including pixel values of the remaining adjacent portions and the input image data of the center portion.

A size of the input image and a size of an output image corresponding to the output image data may be equal to each other.

The input image may include a full high-definition (FHD) image quality. Also, the input image may indicate a moving picture having a plurality of frames per second.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described in detail with reference to the attached drawings. In the following description, well-known functions or constructions are not described in detail since they would obscure embodiments of the invention with unnecessary detail.

Figure 1:
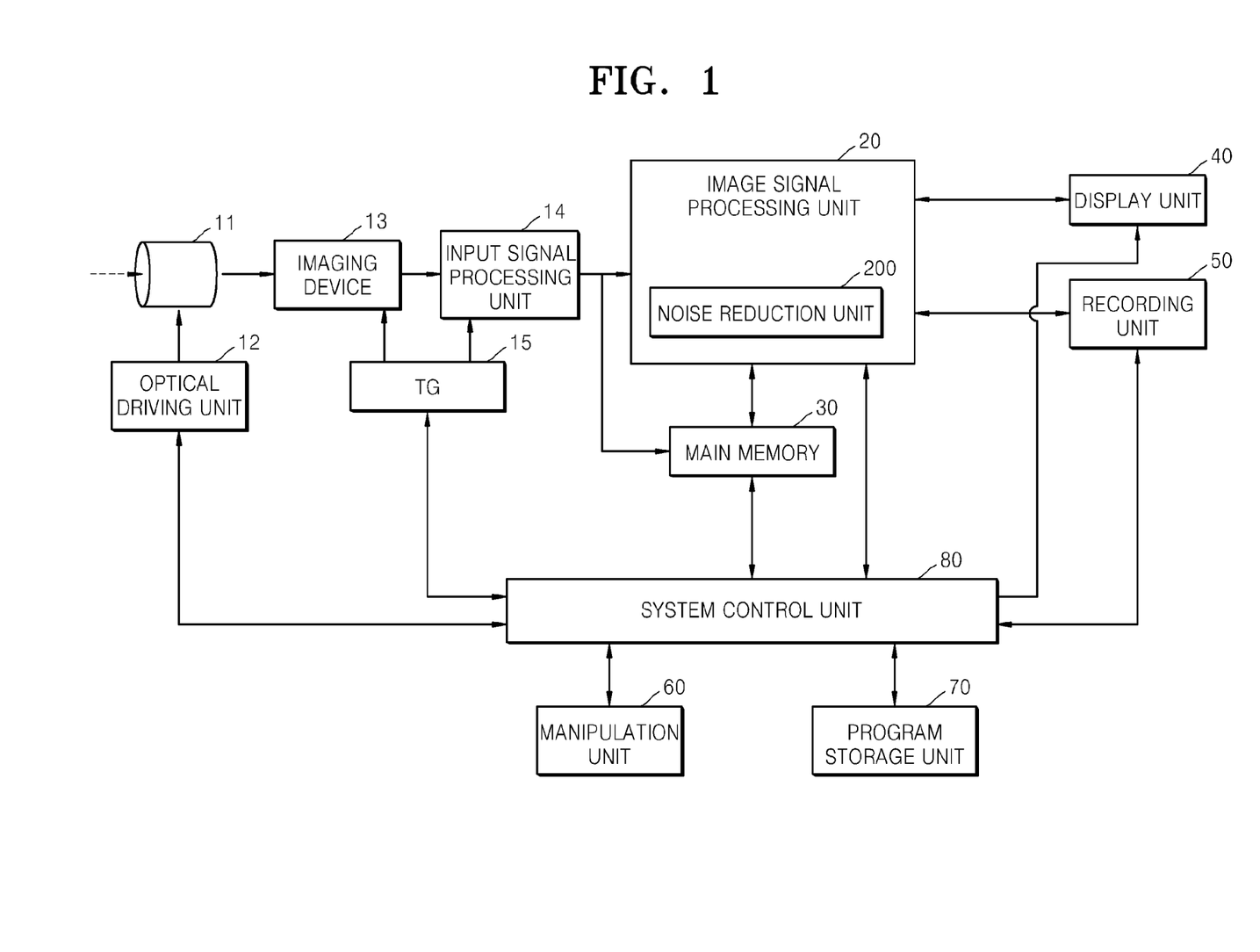
FIG. 1 is a block diagram of a digital image signal processing apparatus, according to an embodiment.

FIG. 1 is a block diagram of a digital image signal processing apparatus, according to an embodiment.

The digital image signal processing apparatus according to the present embodiment may be applied to, for example, a digital camera. However, the digital image signal processing apparatus is not limited to a digital camera and may be applied to any of a plurality of digital devices including camcorders, camera phones, personal digital assistants (PDAs), portable multimedia players (PMPs), televisions (TVs), digital frames, or the like in which the digital image signal processing apparatus may be mounted.

Referring to FIG. 1, the digital camera includes an optical unit 11 for inputting an optical signal corresponding to a target subject, an optical driving unit 12 for driving the optical unit 11, an imaging device 13 for converting the optical signal input via the optical unit 11 into an electric signal corresponding to one image frame, and an input signal processing unit 14 for receiving the electrical signal from the imaging device 13 and converting the electrical signal from an analog signal into a digital signal. In addition, the digital camera includes a timing generator (TG) 15 for supplying a timing signal to the imaging device 13 and the input signal processing unit 14. The digital camera includes an image signal processing unit 20 for performing image signal processing on image data provided from the input signal processing unit 14. The image data may be input to the image signal processing unit 20 in real-time, but if necessary, the image data may be temporarily stored in a main memory 30 and then supplied to the image signal processing unit 20. In addition, the digital camera includes a display unit 40 for displaying an image, a recording unit 50 for storing the image or the like, and a system control unit 80 for overall control of the optical driving unit 12, the TG 15, the main memory 30, the image signal processing unit 20, the display unit 40, the recording unit 50 and the like. In addition, the digital camera includes a manipulation unit 60 for inputting a user manipulation signal, and a program storage unit 70 having stored therein a program related to operations of the digital camera. The system control unit 80 may control each element of the digital camera according to the program stored in the program storage unit 70.

In the present embodiment, the aforementioned units may be divided into separate blocks but are not limited thereto and thus, two or more units may be configured as a single chip. Also, with respect to a unit that performs two or more functions, the unit may be embodied using two or more chips according to the functions.

Hereinafter, the aforementioned units are described in detail.

The optical unit 11 may include a lens for focusing an optical signal, an aperture for adjusting an amount of the optical signal (an amount of light), a shutter for controlling an optical signal input, and the like. The lens may include a zoom lens for controlling a focal length to widen or narrow an angle of view, and a focus lens for adjusting focus of an image of a target subject. Each of the zoom lens and the focus lens may be a single lens or may be a group of lenses. The shutter may be a mechanical shutter having a cover that may move up and down. Also, instead of using a physical shutter, by controlling supply of an electric signal to the imaging device 13, the imaging device 13 may function as the shutter.

The optical driving unit 12 may drive the optical unit 11 according to a lens positioning operation, an aperture opening and closing operation, a shutter operation and the like so as to perform operations of an auto-focus (AF), an auto exposure adjustment, an aperture adjustment, a zoom, a focus change, or the like. The optical driving unit 12 may receive a control signal from the system control unit 80, and thus may drive the optical unit 11. Although not illustrated in FIG. 1, the digital camera may further include an AF control unit that may drive the focus lens of the optical unit 11 by calculating a focus value for correct focus, and by determining and providing position information corresponding to the focus value for the focus lens. Thus, it is possible to obtain a focused image via the optical unit 11.

The imaging device 13 receives an optical signal input via the optical unit 11, and forms an image of a target subject. As the imaging device 13, a complementary metal-oxide semiconductor (CMOS) sensor array, a charge coupled device (CCD) sensor array, or the like may be used. The imaging device 13 may provide image data corresponding to one frame of an image according to the timing signal supplied from the TG 15.

The input signal processing unit 14 may include a circuit for performing signal processing to adjust a gain or shape of a waveform of an electric signal provided from the imaging device 13. In addition, the electric signal is an analog signal, and the input signal processing unit 14 may include an analog-to-digital (AD) converter to convert the analog signal into a digital signal.

The image signal processing unit 20 may include a noise reduction unit 200 for reducing noise of input image data. The noise reduction unit 200 will be described in detail with reference to FIG. 2. In addition, the image signal processing unit 20 may perform image signal processing such as gamma correction, color filter array interpolation, color matrix, color correction, color enhancement and the like so as to improve an image quality. Such processed image data may be transmitted to the display unit 40, and an image corresponding to the image data may be displayed on the display unit 40. Also, the image data may be compressed by the image signal processing unit 20. Such compressed data may be stored in the recording unit 50.

The main memory 30 may load data about a program stored in the program storage unit 70, and may temporarily store information of the system control unit 80 while the system control unit 80 is driven according to the program. Image data that is provided from the input signal processing unit 14 to the program may be transmitted to the image signal processing unit 20 in real-time by the system control unit 80. However, if transmission speed is different from calculation processing speed in the image signal processing unit 20, the image data may be temporarily stored in the main memory 30 and then may be provided to the image signal processing unit 20. The system control unit 80 may use a memory device, such as a synchronous dynamic random access memory (SDRAM), a multi-chip package (MCP) memory or a DRAM, as the main memory 30.

Image data that has undergone image signal processing may be transmitted to the display unit 40 and thus may be realized as a corresponding image. The display unit 40 may be a display device, such as a liquid crystal display (LCD), an organic light emitting diode (OLED), a plasma display panel (PDP), an electronic digital display (EDD) or the like.

Image data that has been image signal processed by the image signal processing unit 20 may be stored in the recording unit 50. The recording unit 50 may be embedded in the digital camera or may be formed as a detachable device. For example, as the recording unit 50, a secure digital (SD) card, a multimedia card (MMC), a hard disk drive (HDD), an optical disc, an optical magnetic disc, a hologram memory, or the like may be used.

The manipulation unit 60 may include a member for a user to manipulate the digital camera or to set various settings for a photographing operation. For example, the manipulation unit 60 may be embodied by a button, a key, a touch panel, a touch screen, a dial or the like, and user manipulation signals related to powering on/off, photographing start/stop, reproduction start/stop/search, drive of an optical system, a mode conversion, menu manipulation, selection manipulation or the like may be input via the manipulation unit 60.

The program storage unit 70 may store therein an operating system (OS), an application program or the like necessary to drive the digital camera. As the program storage unit 70, an electrically erasable programmable read-only memory (E2PROM), a flash memory, a ROM, or the like may be used.

Figure 2:
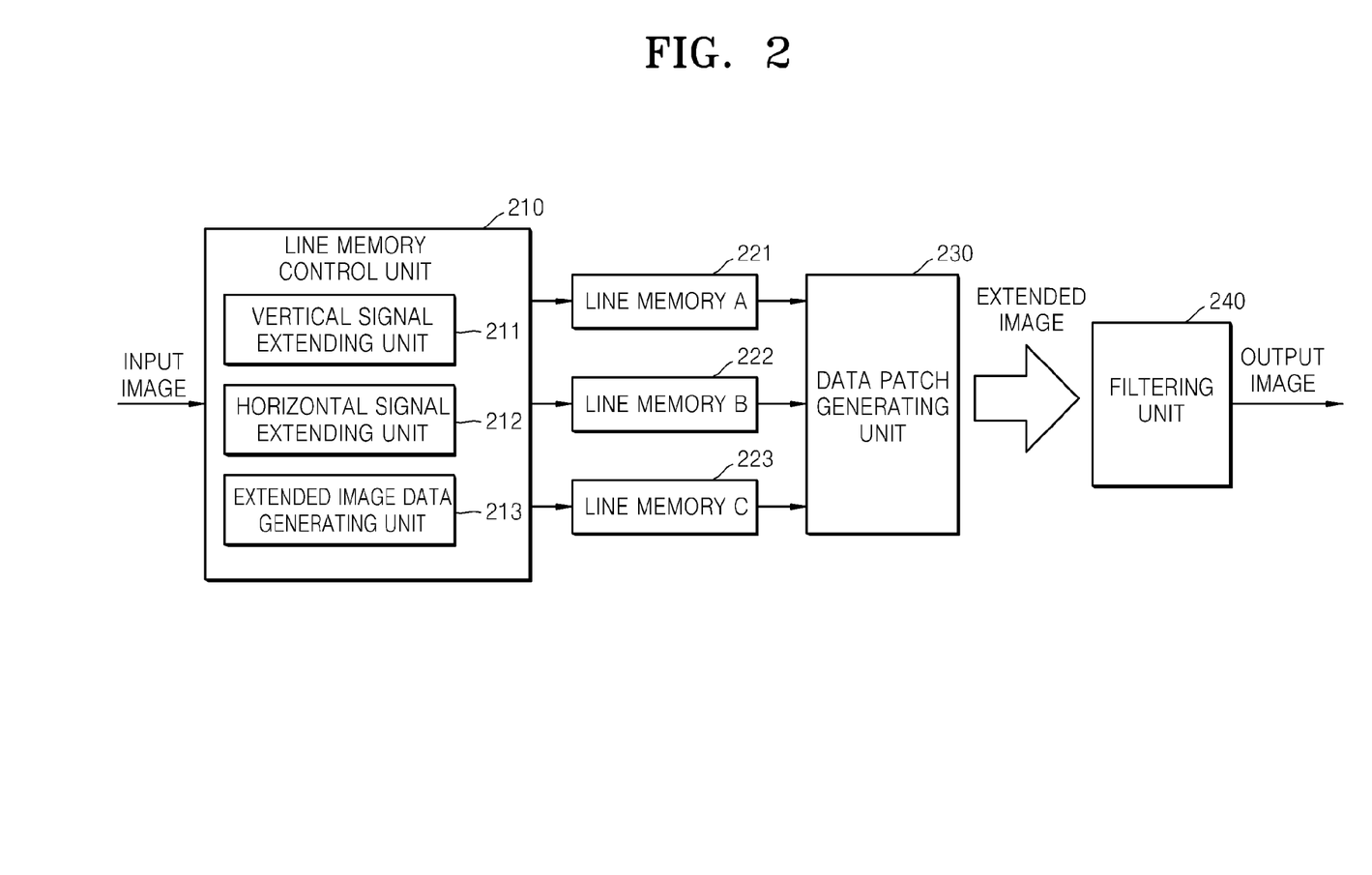
FIG. 2 is a block diagram of an example of a noise reduction unit in an image signal processing unit illustrated in FIG. 1.

FIG. 2 is a block diagram of an example of the noise reduction unit 200 in the image signal processing unit 20 illustrated in FIG. 1.

Referring to FIGS. 1 and 2, the noise reduction unit 200 includes a line memory control unit 210, a plurality of line memories 221, 222, and 223, a data patch generating unit 230, and a filtering unit 240.

Input image data corresponding to an input image may be a plurality of pieces of pixel data arranged two-dimensionally in rows and columns. The input image may be an image which has a full high-definition (FHD) image quality. Also, the input image may be a moving picture. With respect to the noise reduction unit 200, noise reduction filtering will be described with respect to input image data of a first row and a first column of the input image. The input image data of the first row and the first column may be referred to as a noise reduction filtering target or input image data of a center portion of a data patch.

The line memory control unit 210 stores the input image data of lines (rows) in each of the plurality of line memories A 221, B 222, and C 223. The line memory control unit 210 inputs input image data of the first row to the line memory C 223, and transmits the input image data of the first row, which is written in the line memory C 223, to the line memory B 222, thereby inputting the input image data of the first row to the line memory B 222. Then, the line memory control unit 210 inputs input image data of a second row to the line memory C 223. In the embodiment of FIGS. 1 and 2, noise reduction filtering may also be performed on the input image data of the first row and input image data of the first column, which correspond to an edge of the input image, and thus the input image data of the first row is not transmitted to the line memory A 221, that is, the last line memory. In order to allow noise reduction filtering to be performed on the input image data of the first row, the line memory control unit 210 may write a random value such as 0 to the line memory A 221. Also, a value equal to the input image data of the first row and the first column may be used. Thus, the input image data of the first row is written to the line memory B 222, that is, the line memory right next to the line memory A 221, that is, the last line memory. It is assumed that a 3×3 filter is used for this case. In the case where noise reduction filtering is performed on input image data of a first row by using a 5×5 filter, the input image data of the first row may be controlled to be written to a line memory that is 2 rows from the last line memory ($3^{rd}$ line memory), and the last line memory or a (N−1)/2 line memory may be controlled to have a random value such as 0 written thereto (here, N>1 and N is an odd integer).

To be more specific, according to an N×N filter for noise reduction filtering, the line memory control unit 210 may include a vertical signal extending unit 211 for generating a second vertical signal by extending each of start and end of a first vertical signal by (N−1)/2, and a horizontal signal extending unit 212 for generating a second horizontal signal by extending each of start and end of a first horizontal signal by (N−1)/2.

The line memory control unit 210 may include an extended image data generating unit 213 for generating extended image data corresponding to an image extended by the second vertical signal and the second horizontal signal. Here, as the extended image data, a predetermined random value such as 0 may be used, or the input image data of the noise reduction filtering target may be redundantly used. According to the embodiment of FIGS. 1 and 2, as the extended image data, the input image data of the first row and the first column may be used.

Now, the line memory control unit 210 controls output of the input image data stored in each of the line memories A 221, B 222, and C 223. In the case of using a 3×3 filter, by outputting the input image data of the first row and the input image data of the second row from the line memories A 221, B 222, and C 223 by performing an output operation twice in every clock unit, a data patch may be generated. The data patch may be formed in such a manner that one row and one column which are adjacent to the input image data of the first row and the first column have a random value such as 0 or have a value equal to the input image data of the first row and the first column. By controlling the output of the line memories A 221, B 222, and C 223, or extending vertical and horizontal signals forming an input image, the data patch may be generated.

In the case where noise reduction filtering is performed on an input image having a size of X×Y, it is possible to perform a noise reduction filtering calculation on input image data of a first row, input image data of a first column, input image data of an $X_{th}$ row, and input image data of a $Y_{th}$ column. Thus, an output image having the same size as the input image may be obtained.

In the aforementioned procedure, the line memory control unit 210 stores image data in each of the line memories A 221, B 222, and C 223, sequentially accesses each of the line memories A 221, B 222, and C 223, and then outputs the stored image data.

Size of each of the line memories A 221, B 222, and C 223 is determined according to a width size in a column direction of the input image data. The number of the line memories A 221, B 222, and C 223 is determined according to a kernel size of the filtering unit 240. In the embodiment of FIGS. 1 and 2 of FIG. 2, a 3×3 filter is used, and thus, the noise reduction unit 200 includes the three line memories A 221, B 222, and C 223.

The line memories A 221, B 222, and C 223 are mounted on an internal circuit, unlike other storage devices including the main memory 30 connected to the outside via a bus, and although their capacities or the like are limited, as compared to the main memory 30, the line memories A 221, B 222, and C 223 may rapidly and easily access stored data. Thus, it is possible to perform a high-speed operation.

The data patch generating unit 230 may sequentially access a pixel data value stored in each of the line memories A 221, B 222, and C 223, and may generate the data patch for noise reduction filtering. In the embodiment of FIGS. 1 and 2, a 3×3 data patch for noise reduction filtering is used. Size of the data patch may be determined according to the filter size.

The data patch generating unit 230 may include a plurality of delay registers and a data extracting unit. The delay registers shift a plurality of pieces of image data stored in the line memories A 221, B 222, and C 223 by a bit every reference clock, and then store the plurality of pieces of image data. The data extracting unit extracts a plurality of pieces of data in addresses that are predetermined according to a noise reduction filtering rule.

The line memory control unit 210 may control the input image data to be written to each of the line memories A 221, B 222, and C 223, and may control the image data to be output from the line memories A 221, B 222, and C 223, thereby allowing a desired data patch to be generated. The data patch corresponds to an extended image obtained by extending each of start and end of vertical and horizontal signals of an input image by (N−1)/2.

The filtering unit 240 generates output image data by performing filtering on the data patch generated by the data patch generating unit 230, and thus reducing noise therein. The filtering unit 240 calculates a difference between a center pixel value and each of pixel values of adjacent portions in the data patch, and excludes a pixel value of a corresponding adjacent portion from among the adjacent portions if the difference is less than a predetermined reference value. Thus, with respect to a data patch including a random value, the random value may not be reflected on an actual output image.

The filtering unit 240 may include a low pass filter (LPF) and a bidirectional filter. With respect to the data patch, the LPF generates a weight filtering result value by using a matrix formed of weight filtering coefficients. A sum of the weight filtering result value indicates the output image data. According to the related art, when the noise reduction filtering calculation is performed on input image data of two rows and two columns by using a 3×3 filter, output image data of one row and one column is obtained and thus a size of an output image is reduced. However, according to the embodiment of FIGS. 1 and 2, by performing the noise reduction filtering calculation on the input image data of the first row and the first column, output image data of a first row and a first column may be obtained.

By performing the noise reduction filtering calculation on the input image data by repeatedly performing the aforementioned procedure, it is possible to obtain the output image having the same size as the input image while maintaining the same quality as the input image.

Figure 3:
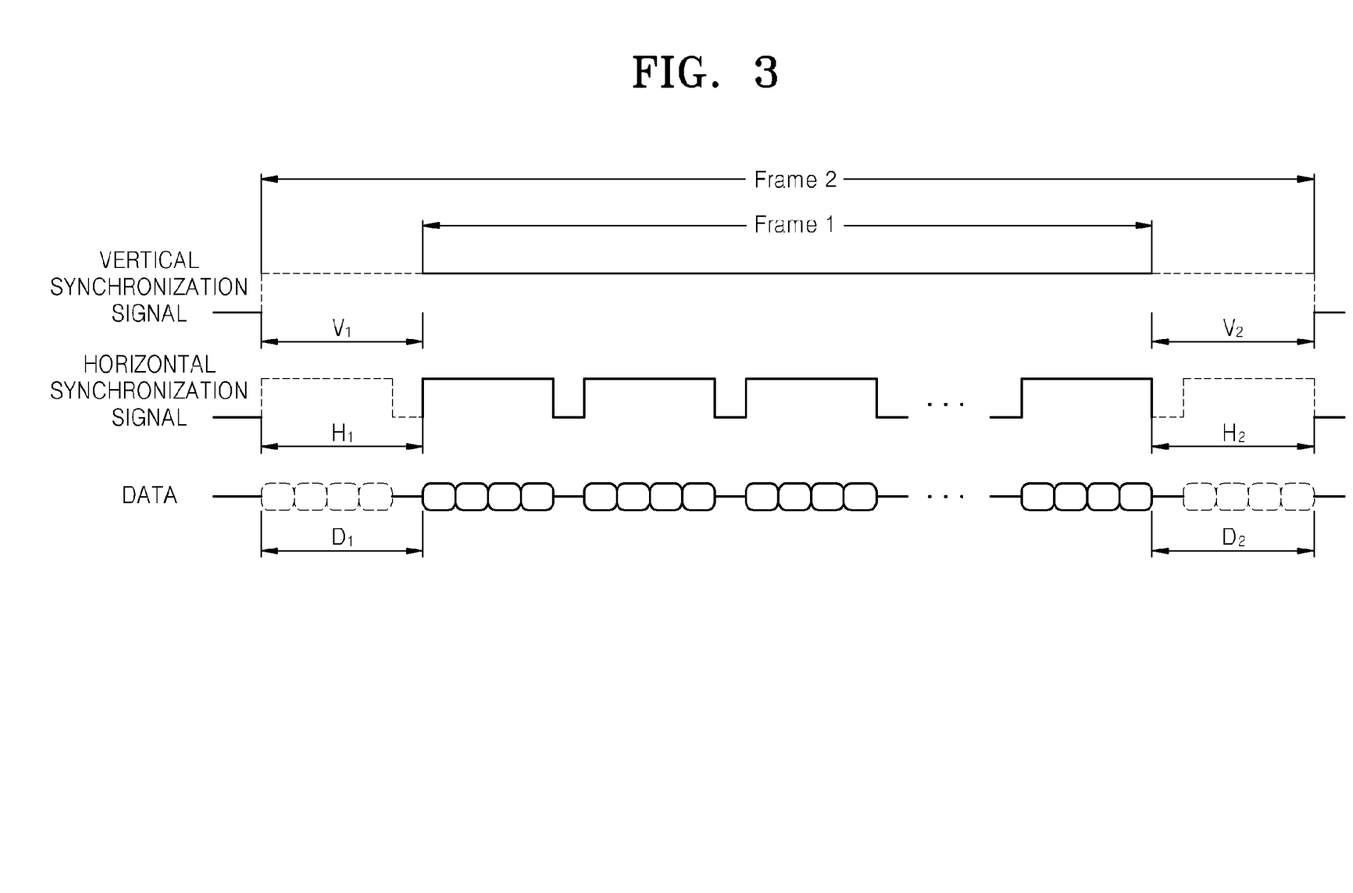
FIG. 3 is an exemplary waveform diagram for describing extension of a vertical signal, a horizontal signal, and data of an input image according to the digital image signal processing apparatus and method thereof.

FIG. 3 is a an exemplary waveform diagram for describing extension of a vertical signal, a horizontal signal, and data of an input image according to the digital image signal processing apparatus and method thereof. A procedure described with reference to FIG. 3 may be one in which an image signal is processed using an application-specific integrated circuit (ASIC).

While the procedure in which the image signal is processed using the ASIC is described, it is not limited thereto, and thus, in the procedure of FIG. 3, the line memory control unit 210 and the data patch generating unit 230 may include a substrate or a field-programmable gate array (FPGA).

Referring to FIG. 3, an input image is formed of a vertical signal (VD, v-sync), a horizontal signal (HD, h-sync), and data, and in this regard, the vertical signal is for synchronization with frames, the horizontal signal is for synchronization with a unit block of each frame, and the data indicates each of a plurality of pixel data values forming each frame.

When a first vertical signal of the input image indicates a Frame 1, a second vertical signal extended from the first vertical signal corresponds to a Frame 2. That is, start and end (corresponding to V1 and V2) of the first vertical signal are extended by (N−1)/2.

By extending start and end (corresponding to H1 and H2) of a first horizontal signal of the input image by (N−1)/2, a second horizontal signal may be generated.

In addition, with respect to the extended second vertical and horizontal signals, extended image data D1 and D2 may be generated.

In general image processing performed in the ASIC, a random access is performed by transmitting a data request signal (REQ) including an address of stored image data and a size of the image data to a memory or a sensor storing the image data, and then reading the image data. However, in the case where the image data is processed by reading the image data according to the random access, there is a considerable limit with respect to a processing function.

For example, if the ASIC is configured to transmit the REQ signal via a bus connected to the memory so as to perform filtering of image data, the REQ signal is transmitted to the memory, data is read from the memory, and an ACK signal is transmitted in response to the REQ signal, and these processes are repeated for every pixel data value of the image data and thus a considerable amount of image processing time is consumed to perform these processes.

Here, other parts of the ASIC may not function since the parts may not have data to be processed until the image data is read from the memory or the like, and thus an efficiency of the ASIC may be significantly limited.

In addition, in the case where an N×N filter is used in an image processing procedure, $N^2$ pixel data values have to be read from a main memory so as to generate a data patch with respect to one pixel, and in this regard, when random access is used, such as in a general ASIC, read image data may not be for a corresponding pixel and thus an image processing efficiency is limited.

The digital image signal processing apparatus according to the embodiment of FIGS. 1 and 2 includes line memories corresponding to a size N of a filter, generates a data patch by using the line memories, and re-usees image data stored in the line memories so as to generate a data patch for a next pixel, thereby maximizing efficiency. Thus, it is possible to perform a high-speed operation.

Figure 4:
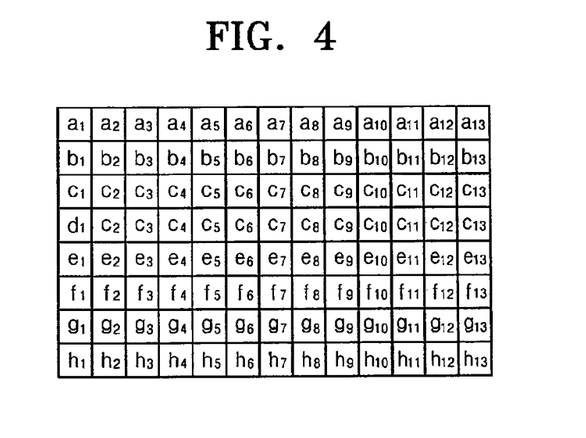
FIG. 4 is a diagram of an example of an input image.
Figure 5A:
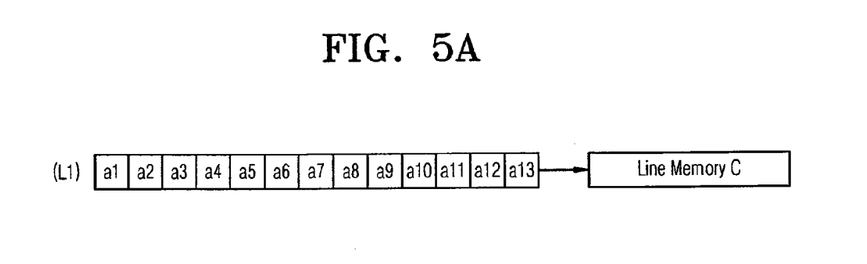
FIGS. 5A and 5B are exemplary diagrams for describing a procedure in which input image data (corresponding to the input image of FIG. 4) is stored in a plurality of line memories.
Figure 5B:
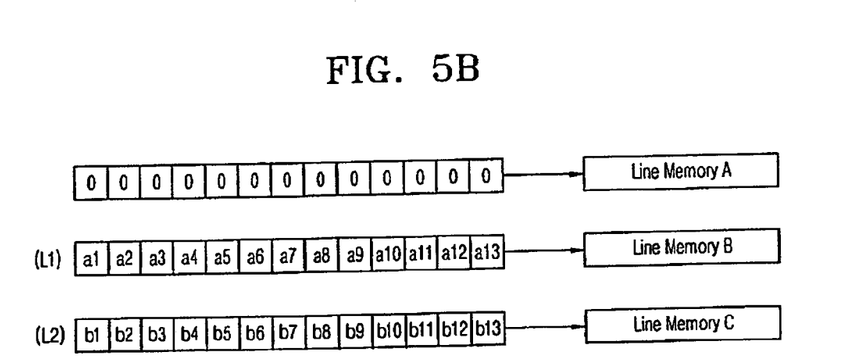

FIG. 4 is a diagram of an example of an input image. FIGS. 5A and 5B are exemplary diagrams for describing a procedure in which input image data (corresponding to the input image of FIG. 4) is stored in a plurality of line memories.

In the embodiment of FIGS. 1 and 2, the input image may have input image data as illustrated in FIG. 4. A process of inputting the input image data into line memories so as to perform noise reduction filtering on a plurality of pieces of image data of a first row and a first column from among the input image will now be described with reference to FIGS. 5A and 5B. With respect to the process, a 3×3 filter is used, and thus, a process in which the input image data is stored in line memories A through C will now be described.

Referring to FIG. 5A, the pieces of image data of the first row (a1 through a13) of the input image are stored in the line memory C. Referring to FIG. 5B, the pieces of image data of the first row (a1 through a13) are transmitted from the line memory C to the line memory B and thus are written to the line memory B. Also, the pieces of image data of a second row (b1 through b13) of the input image are written to the line memory C.

In order to perform noise reduction filtering on the plurality of pieces of image data of the second row of the input image, the pieces of image data of the first row are stored in the line memory A. However, in order to perform noise reduction filtering on the pieces of image data of the first row, the pieces of image data of the first row are stored in the line memory B, and a random value or values equal to the pieces of image data of the first row may be stored in the line memory A.

In order to perform noise reduction filtering on input image data of an eighth row of the input image, the input image data of the eighth row may be stored in the line memory B, and a random value or values equal to the input image data of the eighth row may be stored in the line memory C.

Figure 6A:
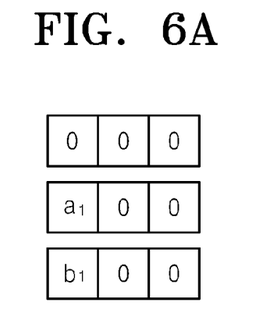
FIGS. 6A and 6B are exemplary diagrams for describing a procedure in which a data patch is generated by controlling output of the input image data of the plurality of line memories of FIGS. 5A and 5B.
Figure 6B:
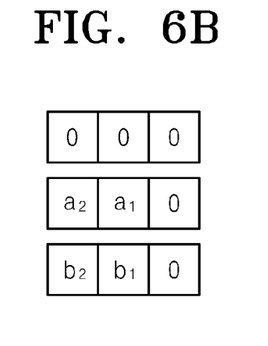

FIGS. 6A and 6B are exemplary diagrams for describing a procedure in which a data patch is generated by controlling output of the input image data of the plurality of line memories of FIGS. 5A and 5B. The pieces of image data stored in the line memories A through C are sequentially accessed to generate a data patch. The pieces of image data are shifted by a bit every reference clock and then are stored in delay registers for each line. Referring to FIG. 6A, pixel values (0, a1, b1) that are stored in the line memories A through C are stored in the delay registers while being synchronized with a first clock. A random value such as 0 may fill the delay registers in which pixel values are not stored. Referring to FIG. 6B, the pixel values (0, a1, b1) that are previously written to the delay register are shifted by a bit according to a second clock. Then, pixel values (0, a2, b2) are stored in the delay registers to which the pixel values (0, a1, b1) have been written. The data patch corresponds to a case in which the noise reduction filtering calculation is performed on the image data (a1) of the first row and the first column of the input image, and thus the data patch may obtain the pixel values as illustrated in FIG. 6B. Here, another random value instead of 0, or a value equal to a1 may be redundantly used.

Figure 7:
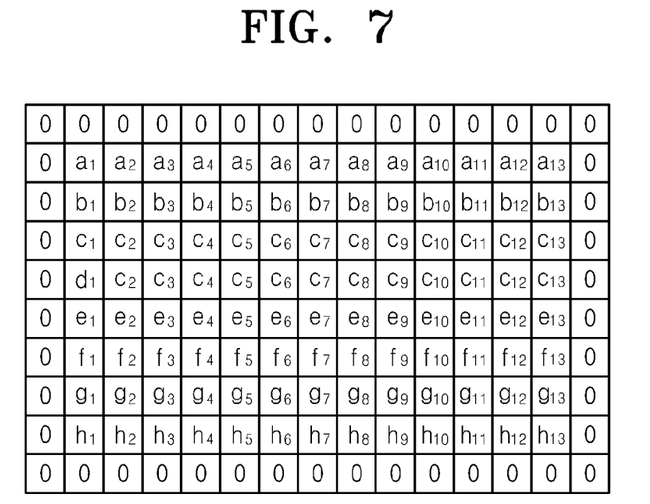
FIG. 7 is an exemplary diagram of an extended image of the input image of FIG. 4.

Thus, the data patch may correspond to an image of FIG. 7 which is an exemplary diagram of an extended image of the input image of FIG. 4. The image of FIG. 7 may correspond to the image obtained by extending a vertical signal and a horizontal signal of the input image of FIG. 4 which have been input to the plurality of line memories A through C. The image of FIG. 7 is with respect to the case of using the 3×3 filter.

Figure 8:
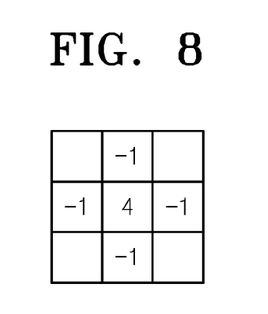
FIG. 8 is a diagram of a filter for noise reduction filtering, according to an embodiment.

FIG. 8 is a diagram of a filter for noise reduction filtering, according to an embodiment. By applying the data patch to the filter illustrated in FIG. 8, noise reduction filtering may be performed. Before the application of the filter, a difference between a pixel value of a center portion and each of a plurality of pixel values of adjacent portions in the data patch may be calculated, and if the difference is less than a reference value, a pixel value of a corresponding adjacent portion from among the adjacent portions may be excluded. Thus, image quality degradation due to extension of the input image may be prevented.

Figure 9A:
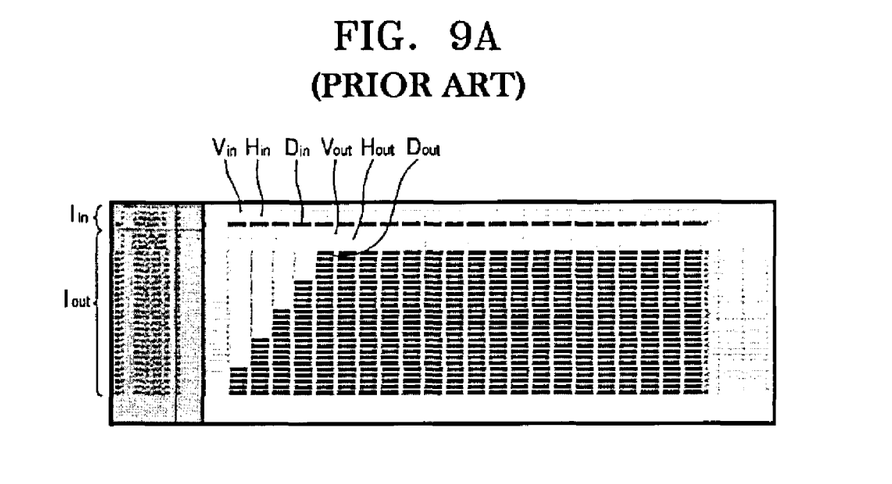
FIG. 9A is an exemplary waveform diagram of an input image signal and an output image signal which has been noise reduction filtered by using a 5×5 filter on the input image according to a conventional digital image signal processing apparatus and method thereof.
Figure 9B:
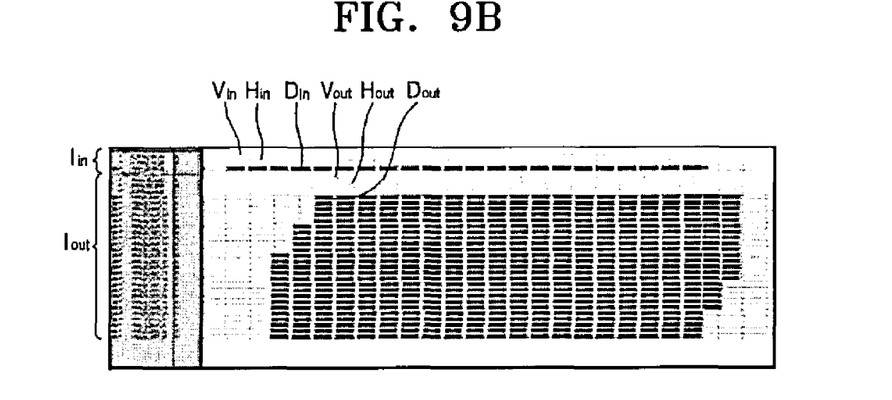
FIG. 9B is a waveform diagram of an input image signal and an output image signal obtained by extending a vertical signal, a horizontal signal, and data of the input image signal by using a 5×5 filter, according to an embodiment.

FIG. 9A is an exemplary waveform diagram of an input image signal $I_{in}$ and an output image signal $I_{out}$ which has been noise reduction filtered by using a 5×5 filter on the input image according to a conventional digital image signal processing apparatus and method thereof. FIG. 9B is a waveform diagram of an input image signal $I_{in}$ and an output image signal $I_{out}$ obtained by extending a vertical signal $V_{in}$, a horizontal signal $H_{in}$, and data $D_{in}$ of the input image signal $I_{in}$ by using a 5×5 filter, according to an embodiment.

Referring to FIG. 9A, as a result of performing noise reduction filtering on a vertical signal $V_{in}$, a horizontal signal $H_{in}$ and data $D_{in}$ of the input image signal $I_{in}$, it is possible to check that a vertical signal $V_{out}$, a horizontal signal $H_{out}$, and data $D_{out}$ of the output image signal $I_{out}$ correspond to a reduced output image.

On the other hand, referring to FIG. 9B according to the present embodiment, as a result of performing noise reduction filtering on the vertical signal $V_{in}$, the horizontal signal $H_{in}$ and the data $D_{in}$ of the input image signal $I_{in}$, it is possible to check via the waveform that a vertical signal $V_{out}$, a horizontal signal $H_{out}$, and data $D_{out}$ of the output image signal $I_{out}$ indicate the same magnitude as those of the input image signal $I_{in}$.

According to the embodiments, by controlling the input image data to be input to and output from the line memories by extending each of the vertical signal and the horizontal signal corresponding to the input image so as to generate the data patch, and by performing noise reduction filtering by using the generated data patch, the digital image signal processing apparatus and method may perform a high-speed operation and may generate the output image having the same size as the input image while maintaining the same quality as the input image.

A program for executing methods of controlling a digital image signal processing apparatus according to the present embodiments and embodiments modified thereof may be stored in a non-transitory computer readable recording medium. Here, the recording medium may be either the program storage unit 70 as shown in FIG. 1, for example, or other recording media. Any processes may be implemented as software modules or algorithms, and may be stored as program instructions or computer readable codes executable on a processor on a non-transitory computer-readable storage media such as flash memory, read-only memory (ROM), random-access memory (RAM), CD-ROM's, DVD's, magnetic tapes, floppy disks, hard disks, and optical data storage devices. The computer readable storage medium can also be distributed over network coupled computer systems so that the computer readable code is stored and executed in a distributed fashion. This computer readable code can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital image signal processing apparatus comprising:
    a plurality of line memories;
    a line memory control unit that controls input image data corresponding to an input image to be input to each of the plurality of line memories, and controls the input image data to be output from the plurality of line memories;
    a data patch generating unit that sequentially accesses the input image data stored in each of the plurality of line memories, and generates a data patch for noise reduction filtering; and
    a filtering unit that performs the noise reduction filtering on the data patch, and generates output image data,
    wherein the line memory control unit generates a second vertical signal and a second horizontal signal obtained by respectively extending a first vertical signal and a first horizontal signal that correspond to the input image, and controls input and output of the plurality of line memories according to the second vertical signal and the second horizontal signal, and
    wherein the line memory control unit further comprises:
        a vertical signal extending unit that generates the second vertical signal by extending each of a start and an end of the first vertical signal by (N−1)/2 according to a (N×N) filter for the noise reduction filtering; and a horizontal signal extending unit that generates the second horizontal signal by extending each of a start and an end of the first horizontal signal by (N−1)/2 according to the (N×N) filter.

2. The digital image signal processing apparatus of claim 1, wherein the line memory control unit further comprises an extended image data generating unit that generates extended image data corresponding to an image extended by the second vertical signal and the second horizontal signal.

3. The digital image signal processing apparatus of claim 2, wherein the extended image data has a predetermined random value or a value equal to input image data that is a target for a noise reduction filtering calculation.

4. The digital image signal processing apparatus of claim 3, wherein, input image data of a center portion is the target for the noise reduction filtering calculation and when a difference between the input image data of the center portion and a pixel value of an adjacent portion in the data patch is less than a reference value, the filtering unit excludes the pixel value of the adjacent portion.

5. The digital image signal processing apparatus of claim 1, wherein a size of the input image and a size of an output image corresponding to the output image data are equal to each other.

6. The digital image signal processing apparatus of claim 1, wherein the input image comprises a full high-definition (FHD) image quality.

7. The digital image signal processing apparatus of claim 1, wherein the input image indicates a moving picture.

8. The digital image signal processing apparatus of claim 1, wherein the line memory control unit and the data patch generating unit comprise at least one of an application-specific integrated circuit (ASIC), a substrate, and a field-programmable gate array (FPGA).

9. A digital image signal processing method of a digital image signal processing apparatus comprising a plurality of line memories, the digital image signal processing method comprising:

generating a second vertical signal and a second horizontal signal obtained by respectively extending a first vertical signal and a first horizontal signal that correspond to an input image;

inputting input image data corresponding to the input image to each of the plurality of line memories according to the second vertical signal and the second horizontal signal;

sequentially outputting the input image data stored in each of the plurality of line memories according to the second vertical signal and the second horizontal signal, and generating a data patch for noise reduction filtering of the input image data; and performing the noise reduction filtering on the data patch, and generating output image data, wherein the generating of the second vertical signal and the second horizontal signal comprises:

generating the second vertical signal by extending each of a start and an end of the first vertical signal by (N−1)/2 according to a (N×N) filter for the noise reduction filtering; and generating the second horizontal signal by extending each of a start and an end of the first horizontal signal by (N−1)/2 according to the (N×N) filter.

10. The digital image signal processing method of claim 9, further comprising generating extended image data corresponding to an image extended by the second vertical signal and the second horizontal signal.

11. The digital image signal processing method of claim 10, wherein the extended image data has a predetermined random value or a value equal to input image data that is a target for a noise reduction filtering calculation.

12. The digital image signal processing method of claim 11, further comprising:

excluding a pixel value of an adjacent portion when a difference between input image data of a center portion and the pixel value of the adjacent portion in the data patch is less than a reference value, wherein the input image data of the center portion is the target for the noise reduction filtering calculation, and performing the noise reduction filtering on the data patch comprising pixel values of the remaining adjacent portions and the input image data of the center portion.

13. The digital image signal processing method of claim 9, wherein a size of the input image and a size of an output image corresponding to the output image data are equal to each other.

14. The digital image signal processing method of claim 9, wherein the input image comprises a full high-definition (FHD) image quality.

15. The digital image signal processing method of claim 9, wherein the input image indicates a moving picture.

* * * * *